United States Patent [19]

Takada

[11] 4,337,667

[45] Jul. 6, 1982

[54] ULTRASONIC FLOWMETER

[75] Inventor: Shinzo Takada, Kawasaki, Japan

[73] Assignee: Tokyo Shibaura Denki Kabushiki Kaisha, Kawasaki, Japan

[21] Appl. No.: 121,176

[22] Filed: Feb. 13, 1980

[30] Foreign Application Priority Data

Feb. 16, 1979 [JP] Japan .................................. 54-16945

[51] Int. Cl.³ .............................................. G01F 1/66
[52] U.S. Cl. ................................................. 73/861.28
[58] Field of Search ............ 73/861.27, 861.28, 861.31

[56] References Cited

U.S. PATENT DOCUMENTS

| 2,515,221 | 7/1950 | Henning ....................... 73/861.27 X |
| 2,746,291 | 5/1956 | Swengel ......................... 73/861.28 |
| 3,050,997 | 8/1962 | Lake ................................ 73/861.27 |
| 4,011,755 | 3/1977 | Pedersen et al. ................. 73/861.28 |

Primary Examiner—Charles A. Ruehl

Attorney, Agent, or Firm—Oblon, Fisher, Spivak, McClelland & Maier

[57] ABSTRACT

An ultrasonic flowmeter includes: a transmitting device for transmitting a continuous ultrasonic wave into a fluid to be measured; a receiving device spaced by a predetermined distance from the transmitting device, for receiving the ultrasonic wave propagating in the fluid; a phase difference detecting circuit for detecting the phase difference between the transmission signal of the transmitting device and the reception signal of the receiving device by converting the phase difference into a time interval enlarged by a frequency mixing means; and a processing circuit for outputting a signal representative of the flow rate of the fluid in response to the output of the phase difference detecting circuit, whereby the flow rate of the fluid is measured with high accuracy by utilizing the phase difference between the signals at the transmission point and the reception point.

1 Claim, 2 Drawing Figures

ULTRASONIC FLOWMETER

BACKGROUND OF THE INVENTION

1. Field of the Invention

This invention relates to ultrasonic flowmeters and more particularly to an ultrasonic flowmeter which is suitable for measuring the velocity of flow of a fluid by utilizing a continuous ultrasonic signal, quickly with high accuracy.

2. Description of the Prior Art

A sing around type flowmeter has been well known as an ultrasonic flowmeter using an ultrasonic wave. In the flowmeter, whenever an ultrasonic pulse from the transmitting device reaches the receiving device through a fluid to be measured, the next pulse is applied to the transmitting device, so that its oscillation signal is obtained from the time required for the ultrasonic pulse to propagate in the fluid to be measured, thereby to measure the flow rate of the fluid.

If, with such a flowmeter, the distance between the transmitting device and the receiving device is L, the velocity of flow of a fluid to be measured is $V_F$, the velocity of sound in the fluid is $V_T$, the angle formed by the line connecting the transmitting device and the receiving device with respect to the direction of flow of the fluid is $\theta$, and the sectional area of a conduit in which the fluid flows is A, and if the time $T_1$ required for a pulse signal, or a pulse signal including the resonance frequency of the transmitting device as the carrier signal, transmitted by the transmitting device to reach the receiving device is measured, then $$T_1 = \frac{L}{V_T + V_F \cos\theta} \tag{1}$$

Therefore, if the value $V_F$ is obtained from the equation (1), then the flow rate U can be obtained from the following equation (2):

$$U = V_F A \tag{2}$$

If, upon reception, the transmission signal is emitted again and this operation is repeatedly carried out, then the number of times (n) of signal transmission is reversely proportional to the aforementioned time $T_1$. According to this fact, signal transmission and reception is repeatedly carried out to average the measurement values. This is the practice employed for the conventional flowmeter to improve the measurement accuracy.

However, the method is still disadvantageous in that, since signal transmission and reception are carried out many times, it takes several seconds to complete the measurement, measurement errors due to the presence of bubbles in the fluid are liable to be accumulated, and measurement errors are liable to be caused because of the deformation of the rise part of the received signal waveform and the irregular fall part of the same.

SUMMARY OF THE INVENTION

Accordingly, an object of this invention is to provide an ultrasonic flowmeter capable of measuring a flow rate with high accuracy.

Another object of the invention is to provide an ultrasonic flowmeter in which measurement can be achieved in an extremely short period of time.

The foregoing objects and other objects of the invention have been achieved by the provision of an ultrasonic flowmeter in which the amount of variation of the phase difference between an ultrasonic wave transmitted by a transmitting device and the ultrasonic wave received by a receiving device due to the velocity of flow of a fluid to be measured is detected with high accuracy, whereby the flow rate of the fluid is indicated.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
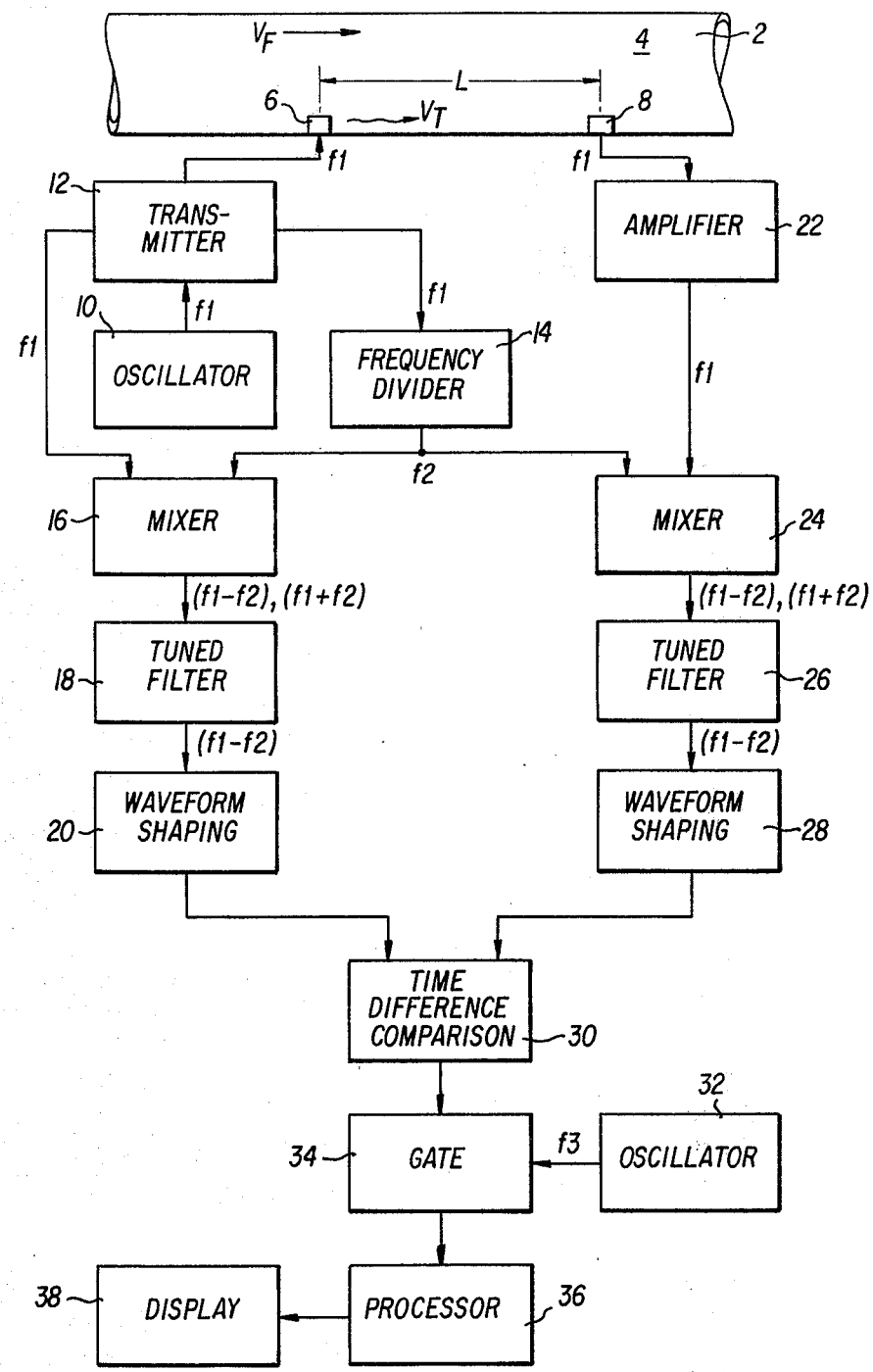
FIG. 1 is a block diagram showing a first example of an ultrasonic flowmeter according to this invention.

Referring now to the drawings, wherein like reference numerals designate identical or corresponding parts throughout the several views, and more particularly to FIG. 1 thereof, one example of an ultrasonic flowmeter according to this invention is shown.

In FIG. 1, reference numeral 10 designates an oscillator circuit for generating a signal having a frequency $f_1$; reference numeral 12 designates a transmitter circuit for transmitting the output signal $\cos \omega_1 t$ (where $\omega_1 = 2\pi f_1$) of the oscillator circuit 10; and reference numeral 2 designates a conduit in which a fluid 4 to be measured flows. A transmitting device 6 for outputting an ultrasonic signal in response to a predetermined input signal and a receiving device 8 for receiving the output ultrasonic signal of the transmitting device are provided on the conduit. More specifically, these devices 6 and 8 are spaced by a predetermined distance L apart from each other on the conduit pipe. As is well known in the art, each of the devices 6 and 8 is a transducer which outputs an ultrasonic signal in response to an electrical signal applied thereto and outputs an electrical signal in response to an input ultrasonic signal. In FIG. 1, a phantom straight line connecting these devices 6 and 8 is in parallel with the flow direction of the fluid to be measured; however, the devices 6 and 8 may be disposed so that the connecting line forms a predetermined angle $\theta$ with the flow direction of the fluid. Alternatively, the devices may be provided on the outer wall or the inner wall of the conduit, or they may penetrate through the wall of the conduit.

In response to the transmitting signal having the frequency $f_1$ from the transmitter circuit, the transmitting device 6 produces an ultrasonic transmitting signal having an amplitude $\cos \omega_1 t$ (where $\omega_1 = 2\pi f_1$).

Further in FIG. 1, reference numeral 14 designates a frequency divider circuit for converting the output signal of the transmitter circuit 12 down to a signal having a frequency $f_2$; and reference numeral 16 designates a mixer circuit in which the signals from the transmitter circuit 12 and the frequency divider circuit 14 are mixed, to provide output signals having frequencies $(f_1 + f_2)$ and $(f_1 - f_2)$. More specifically, the output signal $\cos \omega_1 t$ having the frequency $f_1$ of the transmitter circuit 12 is mixed with the output signal $\cos \omega_2 t$ (where $\omega_2 = 2\pi f_2$) having the frequency $f_2$ of the frequency divider circuit 14, as a result of which the signals having the frequencies $(f_1+f_2)$ and $(f_1-f_2)$ are outputted. Among these output signals, only the signal $(f_1-f_2)$ is selected by a tuned filter circuit 18. The signal thus selected, after being subjected to waveform shaping in a waveform shaping circuit 20, is applied to a time difference comparison circuit 30.

The flowmeter according to the invention further comprises: an amplifier 22 for amplifying the output of the receiving device 8; another mixer circuit 24 in which the output signal having the frequency $f_1$ of the amplifier and the output signal of the frequency divider circuit 14 are mixed, to provide output signals having frequencies $(f_1+f_2)$ and $(f_1-f_2)$; a tuned filter circuit 26 for selecting the signal $(f_1-f_2)$ out of the output signals of the mixer circuit 24; and a waveform shaping circuit 28 for subjecting the output signal of the tuned filter circuit 26 to waveform shaping.

The output of the waveform shaping circuit 28 is applied to the comparison circuit 30. In the comparison circuit 30, the output signal having the frequency $(f_1-f_2)$ of the waveform shaping circuit 20 and the output signal having the frequency $(f_1-f_2)$ of the waveform shaping circuit 28 are subjected to comparison for a phase difference, and a time difference is obtained from the phase difference.

Further in FIG. 1, reference numeral 32 designates an oscillator circuit for generating a time interval measuring clock pulse having a clock frequency $f_3$; reference numeral 34 designates a gate circuit which is controlled by the output of the time difference comparison circuit 30; reference numeral 36 designates a processing circuit for calculating the flow rate of the fluid 4 and for discriminating erroneous measurement or the like according to the output of the gate circuit 34; and reference numeral 38 designates a display unit for displaying a flow rate or the like according to the output of the processing circuit 36.

The above-described circuit elements are all conventional ones which are well known in the art.

If the angular velocity of a transmitting signal from the transmitting device 6 is represented by $\omega_1$, then $$\omega_1 = 2\pi f_1 \tag{3}$$

Therefore, the ultrasonic transmitting signal can be represented by $A_1 \cos \omega_1 t$. The transmitter circuit 12 applies the signal $\cos \omega_1 t$ to the frequency divider circuit and the mixer circuit 16.

The ultrasonic signal outputted by the transmitting device 6 propagates in the fluid 4 in the conduit 2 and is then detected by the receiving device 8, the output of which is amplified by the amplifier 22 and is then applied to the mixer circuit 24. The reception signal is propagated over the distance L between the transmitting device 6 and the receiving device 8, and therefore, it is received as a signal having a phase difference $\alpha$. Thus, the reception signal is detected as a signal $A_2 \cos(\omega_1 t - \alpha)$. The phase difference $\alpha$ depends on the frequency $f_1$, the distance L, and the velocity of flow $V_F$.

If, in this case, the distance L between the transmitting and receiving devices is an integer times a wave length which is represented by the reciprocal of the frequency $f_1$, then with the velocity of flow $V_F=0$, the phase difference $\alpha$ is zero (0), and the value $\alpha$ is in proportion to the velocity of flow $V_F$ only. In the following description, the phase difference $\alpha$ includes a fixed phase difference $\alpha'$ depending on the frequency $f_1$ and the distance L.

On the other hand, the frequency divider circuit 14 outputs a sine wave signal having the frequency $f_2$ which is applied to the mixer circuits 16 and 24. The frequency divider circuit 14 comprises a counter and an amplifying and tuning circuit for generating the frequency $f_2$.

In each of the mixer circuits 16 and 24, the two input frequencies are mixed. As a result, the mixer circuit 16 and the mixer circuit 24 provide output signals which are represented by the following expressions (4) and (5):

$$B_1\{\cos(\omega_1+\omega_2)t + \cos(\omega_1-\omega_2)t\} \tag{4}$$

$$B_2[\cos(\omega_1+\omega_2)t - \alpha] + \cos\{(\omega_1-\omega_2)t - \alpha\}] \tag{5}$$

These output signals are applied to the tuning filter circuits 18 and 26, where only the $(f_1-f_2)$ components are extracted therefrom. Thus, the outputs of the circuits 18 and 26 are represented by the following expressions (6) and (7), respectively:

$$B_1' \cos(\omega_1-\omega_2)t \tag{6}$$

$$B_2'\{\cos(\omega_1-\omega_2)t - \alpha\} \tag{7}$$

The difference in phase between these signals represented by the expressions (6) and (7) is $\alpha$, that is, the phase difference is equal to the phase difference between the transmission signal and the reception signal. However, because of $(\omega_1-\omega_2)$, i.e. since the frequency is $(f_1-f_2)$, if $\alpha$ is indicated as time interval, then it is $(f_1/(f_1-f_2))$ times the time interval of $\alpha$ between the transmission and reception signals with the frequency $f_1$. Thus, the accuracy in measurement is improved as much. In other words, detection of the phase difference $\alpha$ with respect to $(f_1-f_2)$ is effected due to the frequency mixing, and accordingly, the detection of the phase difference can be achieved more readily with higher accuracy than detection of the phase difference $\alpha$ with respect to $f_1$.

The waveform shaping circuits 20 and 28 amplify and saturate the sine wave inputs, thereby to output the signals represented by the expressions (6) and (7) as square wave signals. These circuits 20 and 28 are inserted to facilitate the phase difference detection, i.e. the measurement of the time interval of the rises or falls of the signals.

The outputs of the shaping circuits 20 and 28 are applied to the time difference comparison circuit 30, in which the rises or falls of the input signals are subjected to comparison, and the time interval therebetween is provided as the output of the comparison circuit, which is applied to the gate circuit 34. As the high frequency $(f_3)$ signal is applied to the gate circuit 34 by the oscillator circuit 32, a pulse signal the pulse number of which is proportional to the time interval detected by the time difference comparison circuit 30 is provided.

The output of the gate circuit 34 is supplied to the processing circuit 36. In the processing circuit 36, the signal from the gate circuit 34 is counted and stored every cycle of the frequency $f_1-f_2$ and a plurality of data are subjected to comparison to eliminate abnormal data, and furthermore when the rate of variation of each data exceeds a predetermined value abnormal data is eliminated and the mean value of normal data is calculated.

It is not suitable that when the velocity $V_F$ of the fluid is 0, the fixed phase difference $\alpha'$ exists. Therefore, before the flow-meter is operated, the distance L or the frequency $f_1$ is adjusted so that at a velocity of flow of zero the fixed phase difference $\alpha'$ is zero (0) or an integer times $2\pi$. The same effect may be obtained by providing at least one conventional phase adjuster circuit at the input or output of each circuit on the signal transmission side or in the circuitry itself.

Furthermore, the effects of the fixed phase difference $\omega'$ can be prevented by employing the following method: A velocity of flow $V_1$ or a flow rate $U_1$ are measured with the transmitting device 6 and the receiving device 8 connected respectively to the transmission output and the reception input, and then a velocity of flow $V_2$ or a flow rate $U_2$ are measured with the transmitting device 6 and the receiving device 8 connected respectively to the reception input and the transmission output. The difference between the velocities of flow is divided by two, or the difference between the flow rates is divided by two. Then, the effect of the fixed phase difference $\alpha'$ can be eliminated. In other words, if it is assumed that a phase difference other than the fixed phase difference $\alpha'$ is represented by $\beta$, then one entire phase difference can be expressed by $\beta + \alpha'$, and the other entire phase difference can be expressed by $\beta - \alpha'$. Therefore, if the difference between these data is divided by two, then the effect of the fixed phase difference $\alpha'$ can be eliminated.

In the case where the transmitting device 6 is different in type from the receiving device 8, the effect of the fixed phase difference $\alpha'$ can be eliminated as follows: Two sets of transmitting and receiving devices are arranged at the two positions where the transmitting and receiving devices were provided in the above-described case, respectively, to measure a velocity of flow $V_1$ or a flow rate $U_1$. Then, the positions of the two sets of transmitting and receiving devices are interchanged with each other, to measure a velocity of flow $V_2$ or a flow rate $U_2$. Then, similarly as in the above-described case, the effect of the fixed phase difference can be eliminated.

The setting of a velocity of sound according to a condition of temperature and the type of fluid can be calculated through correction by storing relevant parameters in the processing circuit 36.

Experiments with the apparatus according to the invention will now be described.

If, in the case where the velocity of sound in the fluid 4 is 1500 m/sec, the distance L is 1.005 m, the frequency $f_1$ is 100 KHz, the frequency $f_2$ provided by the frequency divider circuit 14 is 98 KHz and the frequency $f_3$ is 20 MHz, the velocity of flow $V_F$ is 0, then the propagation time of the ultrasonic wave is:

$$1.005 \text{ m}/1500 \text{ (m/sec)} = 670 \times 10^{-6} \text{ sec} = 670 \text{ }\mu\text{sec}$$

That is, it takes 670 $\mu$sec for the ultrasonic signal outputted by the transmitting device 6 to reach the receiving device 8. Thus, because the frequency $f_2$ is 100 KHz, reception of the signal is delayed as much as 67 cycles of 100 KHz. This can be understood from the following calculation (9):

$$670 \text{ }\mu\text{sec}/10 \text{ }\mu\text{sec} = 67 \tag{9}$$

This means that the signal present between the transmitting device 6 and the receiving device 8 corresponds to 67 cycles. In this case, the phase is 67 times $2\pi$, and therefore the phase of transmission coincides with the phase of reception.

If the velocity of flow $V_F$ is changed to 10 m/sec, then the propagation time of the ultrasonic wave is:

$$1.005 \text{ m}/1510 \text{ (m/sec)} = 666 \times 10^{-6} \text{ sec} = 666 \text{ }\mu\text{sec}$$

In this case, $$670 \text{ }\mu\text{sec} - 666 \text{ }\mu\text{sec} = 4 \text{ }\mu\text{sec} \tag{10}$$

Therefore, the phase of the received wave leads that of the transmitted wave by 4 $\mu$sec. In other words, the former leads the latter by $0.8\pi$ with the signal wave of 100 KHz.

$$2\pi \times \frac{4 \text{ }\mu\text{sec}}{10 \text{ }\mu\text{sec}} = 0.8\pi \tag{11}$$

In order to enlarge the phase difference into the time difference, the frequency is decreased to 2 KHz by mixing it with the signal having the frequency 98 KHz. In this case, the phase difference between the transmitted signal and the received signal is maintained $0.8\pi$. Therefore, since one cycle of 2 KHz is 500 $\mu$sec, the time interval is:

$$500 \text{ }\mu\text{sec} \times \frac{0.8\pi}{2\pi} = 200 \text{ }\mu\text{sec} \tag{12}$$

The time difference comparison circuit 30 carries out the process indicated by the equation (12), to output a signal having a frequency of 2 KHz as a signal having a time width 200 $\mu$sec. This output signal is applied to the gate circuit 34.

As the high frequency signal having the frequency $f_3$ or 20 MHz is applied to the gate circuit 34 by the oscillator circuit 32, the output of the comparison circuit 30 is applied as 4,000 pulses per 200 $\mu$sec to the processing circuit 36.

$$200 \text{ }\mu\text{sec}/0.05 \text{ }\mu\text{sec} = 4000 \tag{13}$$

In the processing circuit 36, the pulses are counted into a velocity of flow or a flow rate which is displayed on the display unit 38.

It goes without saying that, when the velocity of flow $V_F$ is 5 m/sec, 2,000 pulses are obtained similarly as in the above-described case.

In the above-described experiment, when the velocity of flow $V_F$ is 10 m/sec, 4,000 pulses are provided, and therefor one pulse corresponds to:

$$10 \text{ m}/4000 = 2.5 \times 10^{-3} \text{ m}$$

Therefore, in this case, the accuracy is 0.025%.

In the case where a smaller diameter conduit is employed, the distance L is 10.05 cm, the frequency $f_1$ is 1 MHz, the frequency $f_2$ is 998 KHz and the frequency $f_3$ is 20 MHz, with a velocity of flow of 10 m/sec 4,000 pulses can be obtained similarly as in the above-described case.

As is clear from the above description if the frequency $f_1$ is increased when the distance between the transmitting and receiving devices is short, and if the frequency $f_1$ is decreased when the distance is long, then the velocity of flow can be measured with the same accuracy. The possibility of decreasing the frequency $f_1$ when the distance L is long provides an advantage in that the attenuation in transmission of the ultrasonic wave can be decreased.

It is desirable that, in mixing the two frequencies $f_1$ and $f_2$, the input frequencies $f_1$ and $f_2$ are different from the output frequencies $(f_1+f_2)$ and $(f_1-f_2)$ so that the output signals of the mixer circuits 16 and 24 can be sufficiently separated from each other and leakage of the input signal into the output signal can be prevented. Therefore, in practice, the mixing is carried out at least two times.

If the frequency $(f_1-f_2)$ is obtained only by a frequency divider circuit instead of a mixer circuit, then a signal $(f_1-f_2)$ synchronous with the transmission signal $f_1$ can be provided. Therefore, the transmission side may be so designed.

Figure 2:
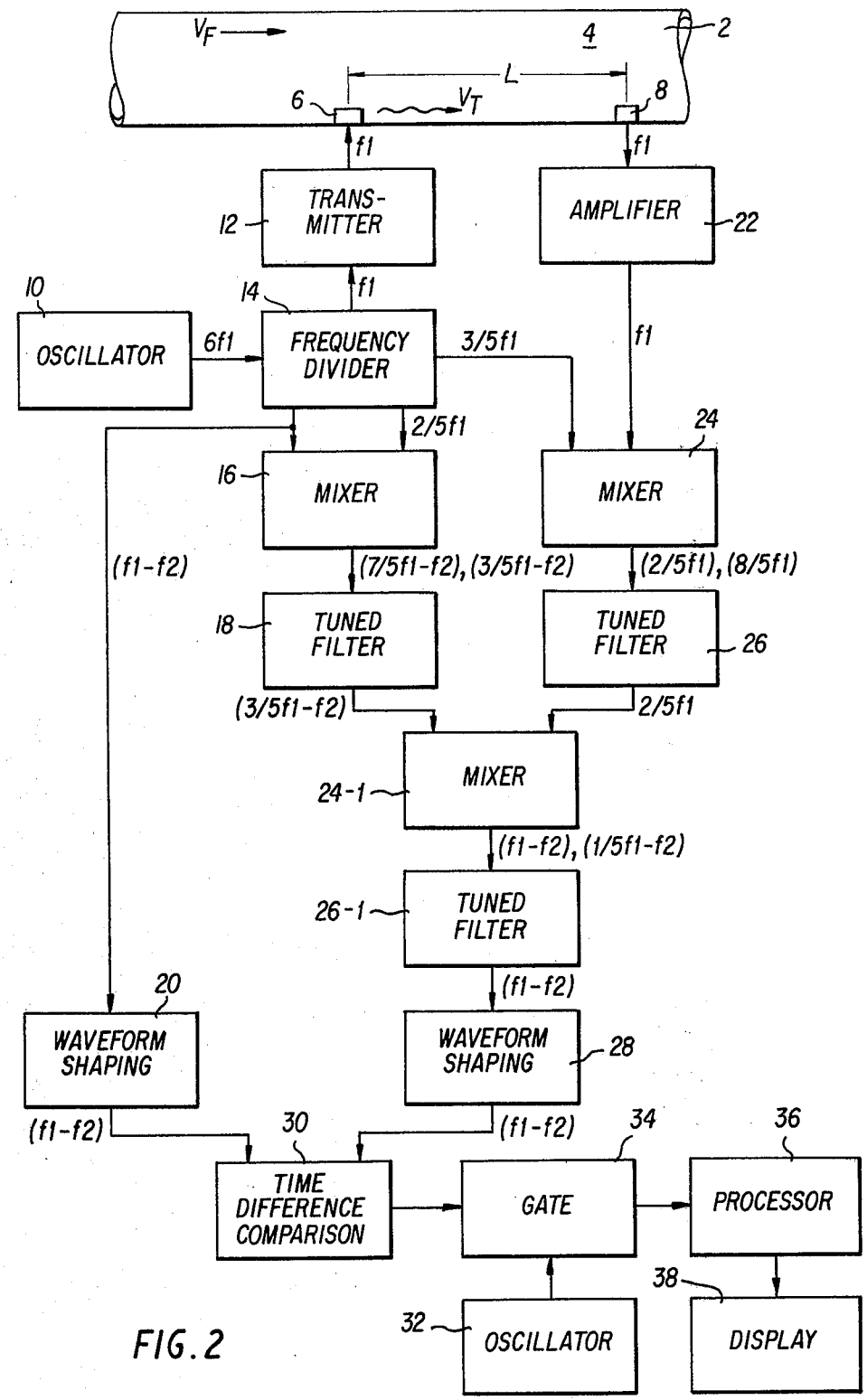
FIG. 2 is also a block diagram showing a second example of the ultrasonic flowmeter according to the invention.

FIG. 2 is a block diagram showing another example of the ultrasonic flowmeter according to the invention, which is designed according to such a technical concept.

In FIG. 2, reference numeral 24-1 designates a mixer circuit, and reference numeral 26-1 designates a tuned filter circuit.

In the circuitry shown in FIG. 2, an oscillator circuit 10 outputs a signal having a frequency $6f_1$ which is six times as high as a transmission signal $f_1$. The output signal is applied to a frequency divider circuit 14, where a frequency $(f_1-f_2)$ is provided through a simple count-down operation. Simultaneously, in the frequency divider circuit 14, the output frequency $6f_1$ of the oscillator circuit 10 is subjected to count-down operation to provides signals having frequencies $(3/5)f_1$ and $(2/5)f_1$.

Among the output signals, the $(3/5)f_1$ frequency signal from the frequency divider circuit 14 is applied to a mixer circuit 24. In the mixer circuit 24, this signal is mixed with the signal having the frequency $f_1$ from an amplifier circuit 22 on the signal reception side, as a result of which the following signals are provided:

$$f_1 + \left(\frac{3}{5}\right)f_1 = \left(\frac{8}{5}\right)f_1 \tag{15}$$

$$f_1 - \left(\frac{3}{5}\right)f_1 = \left(\frac{2}{5}\right)f_1 \tag{16}$$

On the other hand, the signal having the frequency $(2/5)f_1$ and the signal of the frequency $(f_1-f_2)$ from the frequency divider circuit 14 are applied to a mixer circuit 16, as a result of which the mixer circuit 16 outputs two signals having the following frequencies:

$$f_1 - f_2 + (2/5)f_1 = (7/5)f_1 - f_2 \tag{17}$$

$$f_1 - f_2 - (2/5)f_1 = (3/5)f_1 - f_2 \tag{18}$$

The inputs and outputs of the mixer circuits 24 and 16 will be investigated based on the equations (15) through (18). For instance, in the case where $f_1$ is 100 KHz and $f_2$ is 98 KHz, the inputs of the mixer circuit 24, being 100 KHz and 60 KHz, are greatly different from each other and the outputs, being 160 KHz and 40 KHz, are also greatly different. Thus, the signals can be readily separated. On the other hand, in the mixer circuit 16 the inputs are 2 KHz and 40 KHz, and the outputs are 42 KHz and 38 KHz; that is, the percentage of difference between the inputs and that between the outputs are at least 5%. Thus, in the case of the mixer circuit 16 also, the signals can be readily separated.

The tuned filter circuits 18 and 26 operate to select the signals having the frequencies $(3/5)f_1-f_2$ and $(2/5)f_1$ out of the output signals of the mixer circuits 16 and 26, respectively. The signals thus selected are applied to the mixer circuit 24-1. As a result, the mixer circuit 24-1 provides two signals having the following frequencies:

$$\left(\frac{3}{5}\right)f_1 - f_2 + \left(\frac{2}{5}\right)f_1 = f_1 - f_2 \tag{19}$$

$$\left(\frac{3}{5}\right)f_1 - f_2 - \frac{2}{5}f_1 = \left(\frac{1}{5}\right)f_1 - f_2 \tag{20}$$

In this case also, the signals can be readily separated. If $f_1$ is 100 KHz and $f_2$ is 98 KHz, then the inputs are 38 KHz and 40 KHz, while the outputs are 2 KHz and 78 KHz. Thus, separation of the signals can be readily achieved.

Among the signals thus separated, the signal having the frequency $(f_1-f_2)$ is selected by the tuned filter circuit 26-1. Therefore, the output having the frequency $(f_1-f_2)$ which is scarcely affected by the input can be obtained.

The signal of the frequency $(f_1-f_2)$ from the tuned filter circuit 26-1 and the signal from a waveform shaping circuit 20 are applied to a time difference comparison circuit 30. Then, the ultrasonic flow meter in FIG. 2 is operated similarly as in the ultrasonic flow meter in FIG. 1.

The concrete numerical data cited in the example in FIG. 2 should be regarded merely as examples. It is obvious that the frequencies and step-down ratios are varied depending on the requirements of design.

As is apparent from the above description, according to the invention:

(1) Detection of the velocity of flow of a fluid by utilizing a continuous ultrasonic signal is effected by detecting the phase difference between the ultrasonic signal transmitted by the transmitting device and that received by the receiving device. Therefore, the velocity of flow of the fluid can be detected with high accuracy.

(2) The mixer circuits are provided on the ultrasonic wave transmitting side and the ultrasonic wave receiving side, respectively. The local oscillation signals are applied to the mixer circuits, respectively, whereby the phase difference between the signal on the transmitting side and the signal on the receiving side is converted into a relatively long interval signal. Therefore, the detection accuracy is further improved.

(3) The signal having the frequency $(f_1-f_2)$ on the transmitting side is a signal whose phase difference is fixed at the synchronization point with the transmission signal $f_1$, and therefore it can be obtained by counting down the signal $f_1$ in a suitable step-down ratio. Thus, the circuitry can be simplified.

(4) The velocity of flow can be measured with a relatively short period. Therefore, by providing storing, caculating and discriminating functions in the processing means, evaluation of measurement results and elimination of erroneous measurement data can be achieved in a relatively short time.

(5) Even if abnormal data are involved because of the presence of bubbles or the like, the effect thereof can be eliminated by removing such abnormal data or averaging a number of data.

(6) The measurement is carried out by using continuous ultrasonic signals, which minimizes measurement errors accompanying conventional flowmeters, which is attributable to the deformation of pulse signals and the irregular rise or fall time thereof.

(7) The velocity of flow is measured by converting the phase difference into a time difference. Therefore, even if the distance between the transmitting device and the received device is changed, the effect of the attenuation in transmission of the ultrasonic signal can be minimized by employing suitable frequencies according to the variation of the distance, i.e. by using high frequencies of several MHz in the case where the diameter of the conduit is relatively small and the distance between the transmitting device and the receiving device is short, and by using frequencies of the order of 100 KHz in the case where the conduit diameter is relatively large and the distance between the two devices is long. Thus, according to the invention, the velocity of flow can be measured with high accuracy.

Obviously, numerous modifications and variations of the present invention are possible in light of the above teachings. It is therefore to be understood that within the scope of the appended claim, the invention may be practiced otherwise than as specifically described herein.

What is claimed as new and desired to be secured by Letters Patent of the United States is:

1. An ultrasonic flowmeter, comprising:

signal generator means for generating a transmission signal having a frequency ($f_1$), for generating a first reference signal having a frequency ($3/5f_1$), for generating a second reference signal having a frequency ($2/5f_1$), and for generating a third reference signal having a frequency ($f_1 - f_2$);

transmitting means for converting said transmission signal into a continuous ultrasonic wave having a frequency ($f_1$) and for transmitting said ultrasonic wave in a fluid;

receiving means spaced by a predetermined distance from said transmitting means for receiving said ultrasonic wave propagating in said fluid and for converting said ultrasonic wave into a reception signal, said reception signal having a frequency ($f_1$);

first mixer circuit means coupled to receive said second reference signal and said third reference signal for producing a first difference signal, said first difference signal having a frequency ($3/5f_1 - f_2$) which is the difference between the frequency ($2/5f_1$) of said second reference signal and the frequency ($f_1 - f_2$) of said third reference signal;

second mixer circuit means coupled to receive said reception signal and said first reference signal for producing a second difference signal, said second difference signal having a frequency ($2/5f_1$) which is the difference between the frequency ($f_1$) of said reception signal and the frequency ($3/5f_1$) of said first reference signal;

third mixer circuit means coupled to receive said first and second difference signals for producing a corrected reception signal, said corrected reception signal having a frequency ($f_1 - f_2$) which is the sum of the frequency ($3/5f_1 - f_2$) of said first difference signal and the frequency ($2/5f_1$) of said second difference signal; and phase difference detecting circuit means coupled to receive said corrected reception signal and to receive said third reference frequency for detecting a phase difference between said corrected reception signal and said third reference signal and for converting said detected phase difference into a time interval.

* * * * *